United States Patent
Koors et al.

(10) Patent No.: US 7,268,691 B2
(45) Date of Patent: Sep. 11, 2007

(54) WEATHER/ENVIRONMENT COMMUNICATIONS NODE

(75) Inventors: Mark A. Koors, Kokomo, IN (US); Andrew R. Baker, Kokomo, IN (US); Mark C. Hansen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 234 days.

(21) Appl. No.: 11/120,237

(22) Filed: May 2, 2005

(65) Prior Publication Data

US 2006/0244615 A1 Nov. 2, 2006

(51) Int. Cl.
*G01W 1/00* (2006.01)
(52) U.S. Cl. ............... 340/601; 340/825.69; 702/3
(58) Field of Classification Search ........ 340/601, 340/539.28, 602, 825.69, 500; 702/3
See application file for complete search history.

(56) References Cited

U.S. PATENT DOCUMENTS

| | | | |
|---|---|---|---|
| 4,217,646 A * | 8/1980 | Caltagirone et al. ........ 700/296 |
| 5,117,687 A | 6/1992 | Gerardi ................ 73/170 R |
| 5,421,198 A * | 6/1995 | More et al. ............. 73/170.15 |
| 6,031,579 A * | 2/2000 | Stephenson ............ 348/564 |
| 6,597,990 B2 * | 7/2003 | Brown ..................... 702/3 |
| 2003/0126155 A1 * | 7/2003 | Parker et al. ........... 707/104.1 |
| 2006/0030990 A1 * | 2/2006 | Anderson et al. ........... 701/50 |
| 2006/0161309 A1 * | 7/2006 | Moore et al. ............. 700/284 |

FOREIGN PATENT DOCUMENTS

| DE | 4440389 | 5/1996 |
|---|---|---|
| JP | 57056760 | 4/1982 |
| JP | 63214670 | 9/1988 |
| NL | 1012577 | 1/2001 |

OTHER PUBLICATIONS

EP Search Report dated Jun. 29, 2006.

* cited by examiner

*Primary Examiner*—Phung T. Nguyen
(74) *Attorney, Agent, or Firm*—Jimmy L. Funke

(57) ABSTRACT

An apparatus for gathering weather related information is disclosed, in particular wind related information and rain related information, along with associated methods of using the apparatus. The apparatus may calculate at least one of a wind speed, a wind direction, and a rainfall amounts. The apparatus may include a controller, a sensor, and a communication member.

6 Claims, 3 Drawing Sheets

WEATHER/ENVIRONMENT COMMUNICATIONS NODE

TECHNICAL BACKGROUND

The present invention relates to weather sensors and in particular weather sensors for gathering weather related data and communicating weather related information to a remote device.

BACKGROUND OF THE INVENTION

Prior devices used for gathering wind related information, such as anemometers and vanes, have required moving parts. These moving parts tend to wear and degrade in performance over time. Additionally prior devices have used three separate devices to measure wind related information and rainfall related information; one for wind direction, one for wind speed, and one for rainfall.

A need exists for a sensor to gather wind related information, but which is less susceptible to wear and degradation than traditional devices. Also, a need exists for a sensor which is capable of gathering both wind related information and rainfall related information.

SUMMARY OF THE INVENTION

The present invention provides an apparatus for gathering weather related information. In an exemplary aspect of the invention, an apparatus is provided that includes a sensor which is capable of measuring both wind related information and rainfall related information. In another exemplary aspect of the invention, an apparatus is provided that includes a non-wear sensor for the measuring at least one of wind related information and rainfall related information. In one example, the non-wear sensor is a non rotatable sensor. In yet another exemplary aspect of the invention, an apparatus is provided that includes a sensor for the measuring at least one of wind related information and rainfall related information and a communication member for communicating information to a remote device. In a further exemplary aspect of the invention, an apparatus is provided that includes a sensor which is capable of measuring both wind related information and rainfall related information, the apparatus being capable of distinguishing between wind related information and rainfall related information.

In an exemplary embodiment of the present invention, an apparatus for measuring weather related information including wind related information and rainfall related information related to the environment is provided. The apparatus comprising a sensor configured to detect both wind related information and rainfall related information, the sensor including a sensing element which provides data related to both rainfall and at least one of wind speed and wind direction and a controller operably coupled to the sensor and configured to calculate a rainfall amount and at least one of a wind speed and a wind direction.

In a further exemplary embodiment of the present invention, an apparatus for measuring weather related information including wind related information related to the environment is provided. The apparatus comprising a non-rotatable sensor configured to detect wind related information and a controller operably coupled to the sensor and configured to calculate at least one of a wind speed and a wind direction.

In an exemplary method of the present invention, a method of gathering weather related information including wind related information and rainfall related information is provided. The method comprising the steps of providing a non-rotatable sensor contactable by the wind and the rain; monitoring changes in the output of the non-rotatable sensor; and calculating based on changes in the output of the non-rotatable sensor a rainfall amount and least one of a wind speed and a wind direction.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
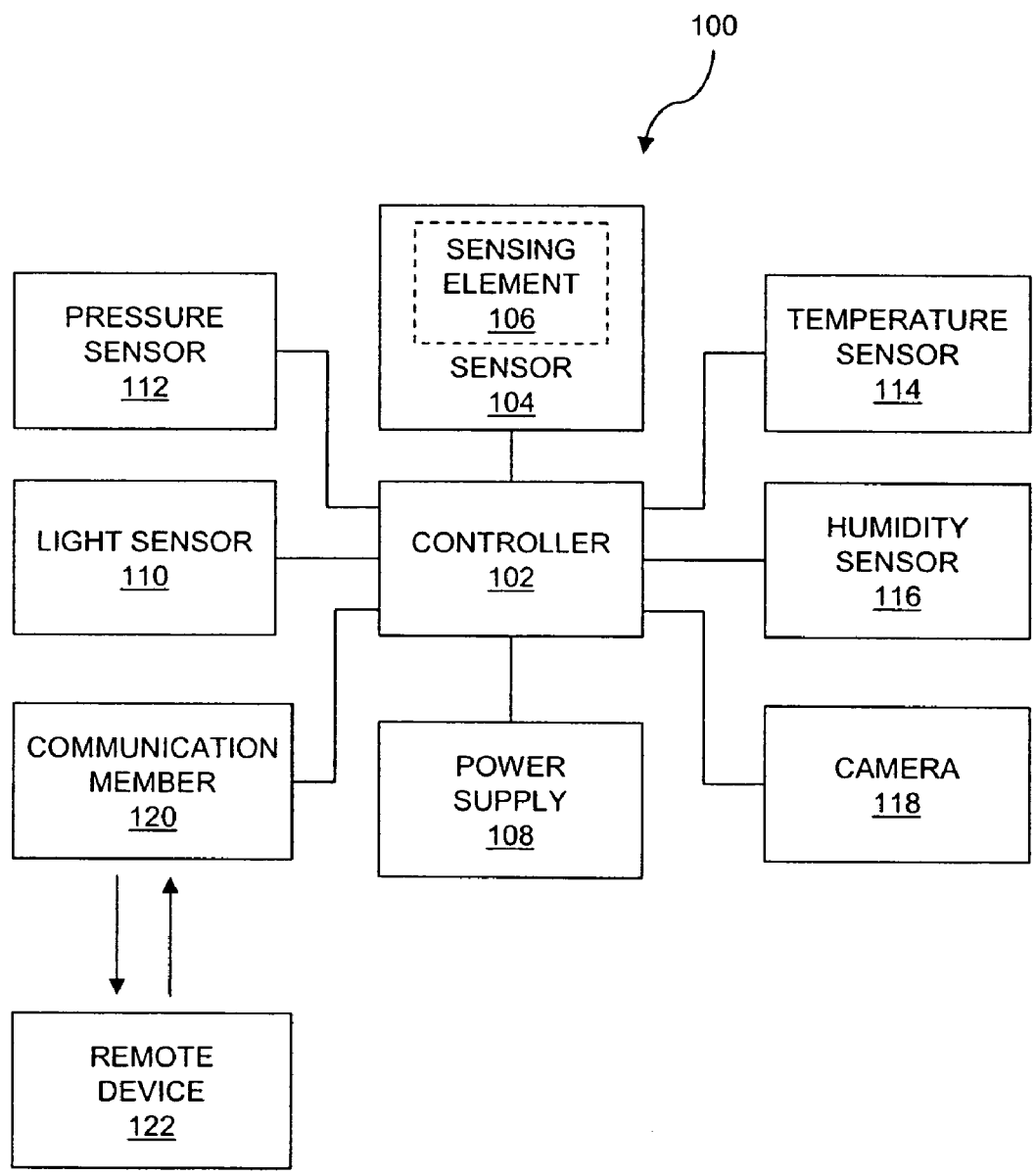
FIG. 1 is a diagrammatic representation of a gathering device configured to gather weather related information.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Referring to FIG. 1, an exemplary weather information gathering device 100 is shown. Gathering device 100 includes a controller 102 and a sensor 104. Sensor 104 includes a sensing element 106 and is capable of gathering wind related information including wind direction, wind speed, or both wind direction and wind speed. Further, in one embodiment sensor 104 is capable of gathering rainfall related information, such as rainfall amounts. Sensor 104 is operably coupled to controller 102 and provides or otherwise makes available to controller 102 information concerning the environment that it is sensing.

In one embodiment, sensor 104 does not have any components that rotate relative to each other. By not having components that move rotationally relative to each other, sensor 104 is more durable and capable of providing repeatable wind information and/or rainfall information because it lacks wear components. In alternative embodiments, sensor 104 is capable of obtaining both wind related information and rainfall related information and includes two or more components which rotate relative to each other or otherwise have wear components.

Controller 102 is operably coupled to a power supply 108. In one embodiment, power supply 108 is an air transformer which transfers power from a high voltage power line to controller 102. In another embodiment, power supply 108 is a solar power supply, such as solar panels and associated batteries. In alternative embodiments, additional suitable power supplies are used.

In one embodiment, gathering device 100 further includes additional sensors to detect additional environmental characteristics. Referring to FIG. 1, gathering device 100 is shown to include a light sensor 110, a pressure sensor 112, a temperature sensor 114, and a humidity sensor 116 each operably coupled to controller 102. Each sensor provides or otherwise makes available to controller 102 information concerning the environment that it is sensing.

In one embodiment, gathering device 100 further includes one or more cameras 118. Cameras 118 may be used to detect airborne events and/or land based events. For example, cameras 118 may monitor traffic flow, security areas (secure property), monitor clouds, lightening, and tornadoes.

In one embodiment, gathering device 100 further includes a communication member 120 which permits gathering device 100 to communicate with remote devices. Communication member 120 permits gathering device 100 to provide a remote device 122, such as a central processing and communication center, with weather related information, such as wind speed, wind direction, rainfall amount, temperature, humidity, pressure, and/or daylight conditions. Further, communication member 120 permits gathering device 100 to provide remote device 122 with visual information captured by cameras 118. This visual data may be used for public information, such as traffic updates and weather updates. Remote device 122 may then disseminate the received information to a wider audience, such as a television audience. In one embodiment, images from remote device 122 may be quickly analysed to determine if road traffic is stalled and then immediately notify drivers through their radios of a traffic jam.

In one embodiment, communication member 120 communicates with remote device 122 by wired transmission, such as thru the power line (illustratively such as power line 132 in FIG. 2) associated with power supply 108. In another embodiment, communication member 120 communicates with remote device 122 by wireless transmission, such as radio frequency transmissions. In one exemplary wireless transmission for communication member 120, gathering device 100 communicates with remote device 122 over HAM radio band frequencies. In another exemplary wireless transmission for communication member 120, gathering device 100 communicates with remote device 122 through an ORBCOMM (ORBCOMM is a registered trademark of ORBCOMM Global, L.P.) satellite network. Alternative types of wireless transmission include cellular transmissions and 802.11 networks.

In a further embodiment, communication member 120 has two modes of communication with remote device 122. In one mode communication member 120 communicates with remote device 122 by wired transmission, such as thru the power line associated with power supply 108. In another mode communication member 120 communicates with remote device 122 by wireless transmission, such as radio frequency transmission.

The communication capability of gathering device 100 may be used by devices which are in close proximity thereto. In one example, communication member 120 may be connected to the Internet and cars and/or persons living close to gathering device 100 may use the respective gathering device as an access point to the Internet.

Figure 2:
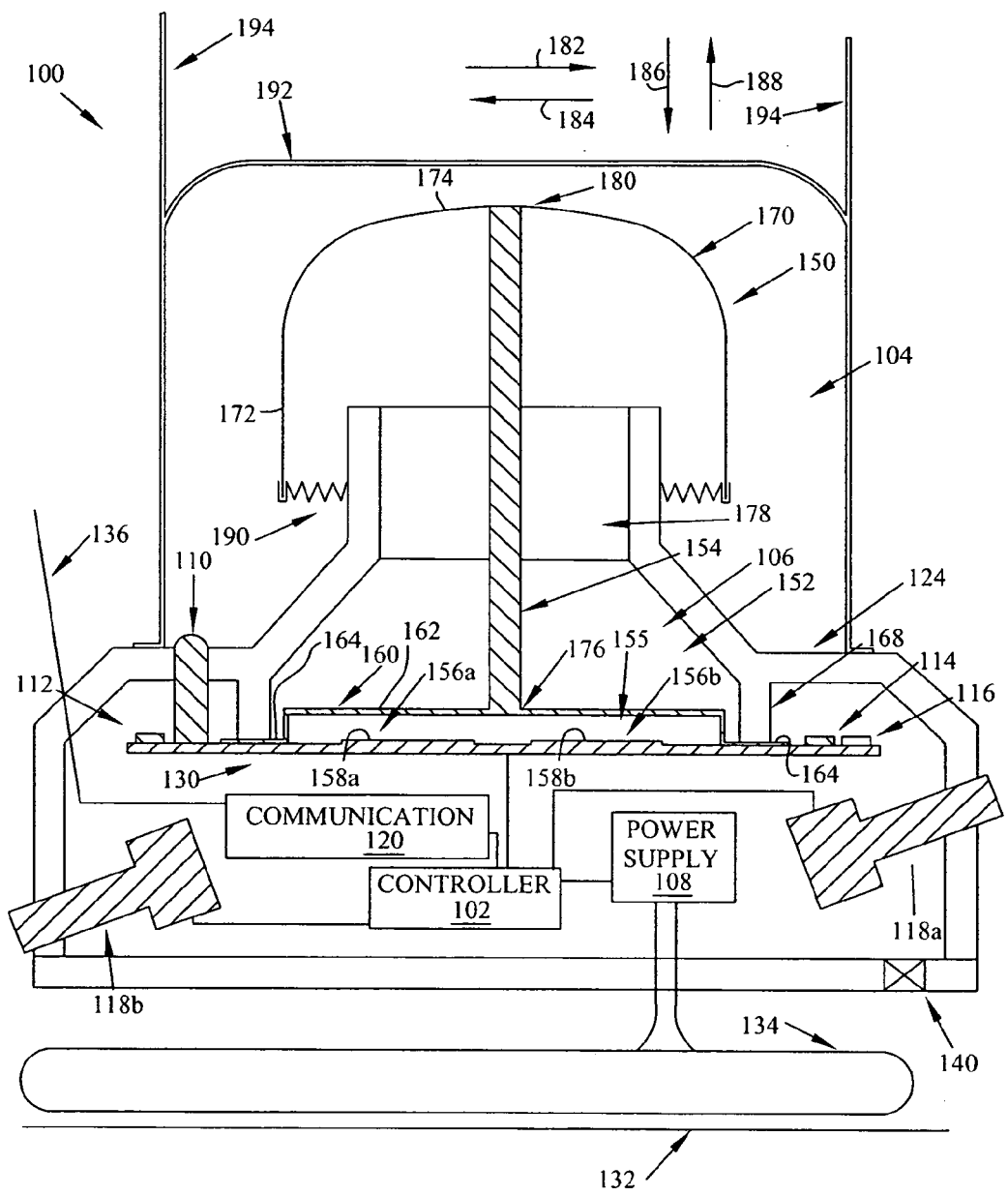
FIG. 2 is an illustrative embodiment of the gathering device of FIG. 1 including a sensor having an upper symmetrical portion contactable by the environment and a lower portion coupled to the upper symmetrical portion, the lower portion having a deflectable member and a plurality of conductive areas which cooperate to form a plurality of capacitors.

An illustrative embodiment of gathering device 100 is shown in FIG. 2. Controller 102 is operably coupled to a circuit board 130. Power supply 108 is connected to a power line 132 through an air transformer 134. In one example, air transformer 134 is a clamp-on air transformer. Communication member 120 is shown connected to antenna 136 for wireless communication of information to a remote device, such as remote device 122.

Two cameras 118a and 118b are illustratively shown. Camera 118a is angled upward to monitor air-based events. Camera 118b is angled downward to monitor ground-based events.

Gathering device 100 further includes a housing 124. Housing 124 may be a revolved housing or a non-revolved housing. However, housing 124 may be any shape. In one embodiment, housing 124 is made of die cast aluminum. Housing 124 is attached to a support (not shown), such as a utility pole. Housing 124 protects many components of gathering device 100 from the environment. The electronics of gathering device 100 are generally positioned within housing 124 and are protected from the environment. Pressure sensor 112, temperature sensor 114, and humidity sensor 116 are mounted on circuit board 130 and are generally protected from the environment by housing 124. It should be noted that housing 124 does include a vent 140 to allow the internal pressure of housing 124 to be equal to the external or environmental pressure.

Sensor 104 illustratively includes an upper portion or probe 150, a lower portion 152 and a coupler 154 which couples upper portion 150 to lower portion 152. Lower portion 152 includes sensing element 106 which illustratively includes a plurality of sensor elements 155. Illustratively sensor elements 155 are a plurality of capacitors 156a and 156b which are formed from conductive areas 158a and 158b, respectively, on circuit board 130 and a deflectable member 160. Deflectable member 160 is illustratively shown as a metal spring. In other embodiments, sensing element 106 includes a strain gage to determine sensing element flex. In one embodiment, member 160 may be rigid and suspended on conventional coiled springs.

Figure 3:
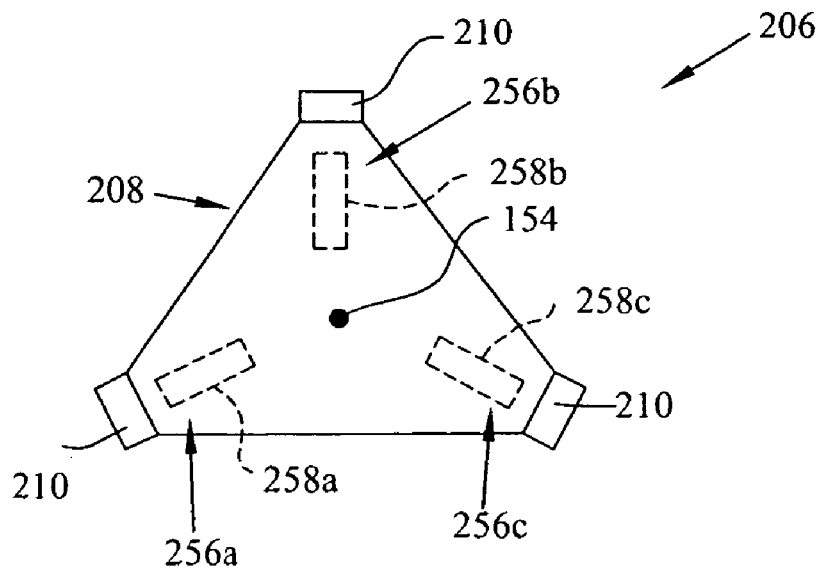
FIG. 3 is a top view of an illustrative deflectable member and three corresponding conductive areas which cooperate to form three capacitors.

Deflectable member 160 is made from a conductive material such as metal. Deflectable member 160 includes a central portion 162 which is spaced apart from conductive areas 158 and one or more contacts 164 which are coupled to circuit board 130. As shown in FIG. 3, contacts 164 of deflectable member 160 and circuit board 130 are coupled to a mounting ring 168 of housing 124. Deflectable member 160 forms the grounded portion of capacitors 156.

As explained herein, movement of upper portion 150 is transmitted to deflectable member 160 through coupler 154 such that the movement of upper portion 150 causes the deflection of deflectable member 160. The direction and magnitude of deflection of deflectable member 160 results in changes in the capacitance of capacitors 156 as explained herein. These changes in capacitance are used by controller 102 to calculate one or more of wind speed, wind direction, and rainfall amount. Although deflectable member 160 does deflect during the operation of gathering device 100, such deflection is not to the point of causing wear. As such, sensor 104 may be considered a non-wear sensor.

In one embodiment, sensing element 106 of sensor 104 includes three or more capacitors 156 whose capacitance varies for different wind and/or rainfall conditions. These changes in capacitance are used by controller 102 to calculate one or more of wind speed, wind direction, and rainfall amount. As explained herein, controller 102 is able to distinguish between wind related changes in capacitance and rainfall related changes in capacitance.

Changes in the capacitance of capacitors 156 of sensing element 106 may also be caused by changes in environmental humidity and temperature values. In one example, the information provided by temperature sensor 114 and/or humidity sensor 116 are used by controller 102 to determine a reference capacitance expected from each capacitor 156 of sensing element 106. As such, the information provided by temperature sensor 114 and/or humidity sensor 116 may be used to distinguish "non-wind events" such as changes in temperature and humidity of the environment from "wind events" such as downdrafts and gusts.

In another example, a reference capacitor (not shown) is used to provide a reference capacitance for sensing element 106. The reference capacitor is not affected by changes in wind condition or rainfall condition. As such, changes in the capacitance of the reference capacitor may be used to distinguish "non-wind events" such as changes in temperature and humidity of the environment or other environmental conditions from "wind events" such as downdrafts and gusts. In yet another example, both information provided by temperature sensor 114 and/or humidity sensor 116 and a reference capacitor may be used to distinguish "non-wind events" such as changes in temperature and humidity of the environment or other environmental conditions from "wind events" such as downdrafts and gusts.

Upper portion 150 includes a dome 170. Dome 170 should be symmetrical such that it has a symmetrical reaction to winds impacting it from the North, South, East, or West. In one embodiment, dome 170 is generally cylindrical with a cylindrical side wall 172 and a domed top 174. Top 174 is domed to prevent the accumulation of precipitation and debris. In alternative embodiments, other symmetrical shapes may be used for probe 150. In one example, dome 170 is made of plastic. In another example, dome 170 is made from aluminum and has a thickness similar to traditional soda cans.

Coupler 154 is coupled to deflectable member 160 at a center 176 of deflectable member 160 and is further coupled at a center 180 of dome 170. Coupler 154 extends from deflectable member 160 through an opening 178 in housing 124 to dome 170. Opening 178 is sized to permit the movement of coupler 154 in all radial directions, such as directions 182, 184 shown in FIG. 2.

The size of dome 170 is selected such that sides 172 do not contact housing 124 as dome 170 is moved in radial directions, such as radial directions 182, 184 and as dome 170 moves in vertical directions 186, 188. A seal 190 is provided between dome 170 and housing 124. Seal 190 prevents foreign material from entering housing 124 from the gap between sides 172 of dome 170 and housing 124. In one example, seal 190 is an elastomer seal.

Dome 170 is protected by a cage 192 which allows wind and rain to pass there through. In one embodiment, cage 192 is made of wire. Cage 192 includes a plurality of vertical spikes 194 which prevent birds and large insects from interfering with gathering device 100 and causing false signals, such as by nesting or otherwise sitting on cage 192.

Figure 4:
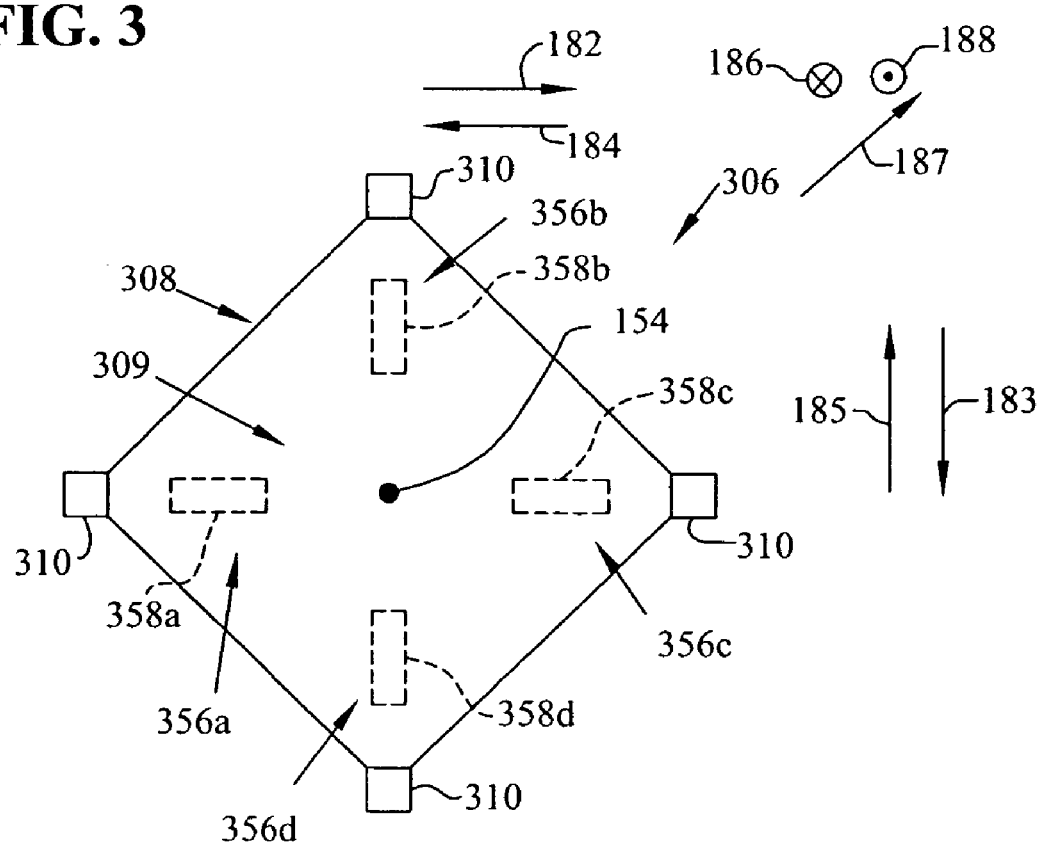
FIG. 4 is a top view of another illustrative deflectable member and four corresponding conductive areas which cooperate to form four capacitors.

Referring to FIGS. 3 and 4, two embodiments of sensing element 106 are shown, sensing elements 206 and 306, respectively. Referring to FIG. 3, sensing element 206 includes a delta plate 208 which corresponds to deformable member 160. Delta plate 208 is attached to circuit board 130 at three contacts 210. Further, three conductive areas 258a-c on circuit board 130 are shown. As such, sensing element 206 forms three capacitive sensors 256a-c, each one equally spaced about coupler 154 and aligned with a respective contact 210.

Referring to FIG. 4, sensing element 306 includes a quad plate 308 which corresponds to deformable member 160. Quad plate 308 is attached to circuit board 130 at four contacts 310. Further, four conductive areas 358a-d on circuit board 130 are shown. As such, sensing element 306 forms four capacitive sensors 356a-d, each one equally spaced about coupler 154 and aligned with a respective contact 310.

Wind direction may be determined in three axes with sensing element 206, including a first axis corresponding to directions 182 and 184 in FIG. 2, a second axis corresponding to wind in and out of the page of FIG. 2, and a third axis corresponding to direction 186 in FIG. 2. As such, with sensing element 206, sensor 104 may determine wind direction as a function of North, South, East, and West as well as the presence of downdrafts in direction 186.

In one embodiment, sensing element 306 is used to provide greater accuracy due to the presence of a fourth capacitor 356d and to provide for redundancy in case of the operational failure of one of capacitors 356a-c. Further, with four sensors, a negative response is expected opposite a sensor with a positive response.

Referring to FIGS. 2 and 4 and assuming that sensing element 306 is positioned in the gathering device of FIG. 2, the operation of sensing element 306 is explained by way of a few examples. It should be noted that sensing element 106 (having at least three capacitors) and sensing element 206, operates in a similar fashion. In a first example, a downdraft of wind heading in direction 186 impinges on dome 170. Assuming no additional wind is present, dome 170 will cause coupler 154 to move downward in direction 186 thereby causing a central portion 309 of quad plate 308 to defect downward. Since the only movement of coupler 154 is downward all of capacitors 356a-d will detect an approximate equal change in capacitance, the capacitance will increase due to a decrease in the air gap between conductive areas 358a-d and quad plate 308. Therefore, controller 102 may determine the direction of the wind based on the relative changes in capacitance of capacitors 356a-d. Further, the speed of the wind may be determined based at least in part on the magnitude of the change in the capacitance of capacitors 356a-d. When a lateral wind blows on sensing dome 170, dome 170 is deflected sideways and a moment is created at the deflectable member 160. This in turn causes one side of deflectable member 160 to be lifted while the other side is forced downward. The different heights of deflectable member 160 relative to the respective conductive areas will result in different capacitances. The pattern of those capacitance variances will indicate wind direction while the magnitude of those capacitance variances will indicate wind speed.

In a second example, wind heading in direction 182 impinges on dome 170. Assuming no additional wind is present, dome 170 will cause an upper portion of coupler 154 to move in direction 182. The movement of the upper portion of coupler 154 in direction 182 in turn causes quad plate 308 to deflect downward relative to capacitor 356c and to deflect upward relative to capacitor 356a. As such, the capacitance of capacitor 356c will increase due to the decrease in the air gap between conductive area 358c and quad plate 308 and the capacitance of capacitor 356a will decrease due to the increase in the air gap between conductive area 358a and quad plate 308. Therefore, controller 102 may determine the direction of the wind based on the relative changes in capacitance of capacitors 356a and 356c and also the relative non change or generally equal change in the capacitance of capacitors 356b and 356d. Further, the speed of the wind may be determined based at least in part on the magnitude of the change in the capacitance of capacitors 356a and 356c.

In a third example, wind heading in direction 187 (FIG. 4) impinges on dome 170. Assuming no additional wind is present, dome 170 will cause an upper portion of coupler 154 to move in direction 187. The movement of the upper portion of coupler 154 in direction 187 in turn causes quad plate 308 to deflect downward relative to capacitors 356b and 356c and to deflect upward relative to capacitors 356a and 356d. As such, the capacitance of capacitors 356b and 356c will increase due to the decrease in the air gap between conductive areas 358b and 358c and quad plate 308 and the capacitance of capacitors 356a and 356d will decrease due to the increase in the air gap between conductive areas 358a and 358d and quad plate 308. Therefore, controller 102 may determine the direction of the wind based on the relative changes in capacitance of capacitors 356a-d. Assuming capacitors 356b and 356c each exhibited about an equal increase in capacitance, controller 102 may determine that direction 187 is angled upward about 45° relative to direction 182. Assuming capacitor 356b exhibited a larger change in capacitance than capacitor 356c, controller 102 will determine that direction 187 is angled upward greater than 45° relative to direction 182. Further, the speed of the wind may be determined based at least in part on the amount of change in the capacitance of capacitors 356a-d.

As stated herein sensor 104 is further capable of detecting rainfall and controller 102 is capable of calculating a rainfall amount based on sensor 104. Rainfall manifests itself as impulses, quick changes in capacitance of capacitors 156, 256a-c, 356a-d, due to the discrete nature of raindrops. In contrast, wind tends to have a longer temporal characteristic than rainfall.

When a raindrop impinges on dome 170, dome 170 causes deflectable member 160 to deflect downward similar to a downdraft. As stated above, since the force exerted by a raindrop against dome 170 is shorter in time than the force exerted by a downdraft, the change in capacitance of capacitors 156 is a short impulse. Assuming that rain is falling at terminal velocity, the magnitude of the sensed impulse is relative to the mass of the raindrop. As such, the magnitude of the sensed impulse may be used to quantify the rainfall in terms of inches of water. In one example, the impulse is integrated to determine the energy of the raindrop. Rain that is falling with a horizontal component will be sensed by its vertical component with sensor 104.

Rain that is falling in conjunction with a downdraft will be accelerating due to the downdraft. This acceleration may be compensated for by controller 102 since it is able to calculate the magnitude of the downdraft as stated in the above examples. This calculated downdraft is then used in calculating rainfall.

Rain that is driven sideways still has a vertical component to its trajectory. Gathering device 100 only looks at the common response of the capacitive elements to determine rainfall. The horizontal component of the rain is discounted as it causes a varying impulse response in the sensor elements. Further, the horizontal component does not affect wind speed readings because wind has a lot longer time constant.

In one embodiment, a plurality of gathering devices 100 which include non-wear sensors 104 are positioned at various points within a desired area. In one example, gathering devices 100 are spaced at approximately one-half mile intervals over the desired area to provide coverage of the desired area.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An apparatus for measuring weather related information including wind related information and rainfall related information related to the environment, the apparatus comprising:
   a sensor configured to detect both wind related information and rainfall related information, the sensor including:
   a sensing element which provides data related to both rainfall and at least one of wind speed and wind direction
   a symmetrical first portion positioned such that the symmetrical first portion is contactable by the wind,
   a second portion positioned within the housing and having a plurality of sensor elements,
   a deflectable member overlaying the sensor elements of the second portion,
   a coupler coupling the symmetrical first portion to the deflectable member, and
   at least three conductive areas on a support and the deflectable member is grounded such that the conductive areas and the deflectable member cooperate to form at least three capacitors;
   a controller operably coupled to the sensor and configured to calculate a rainfall amount and at least one of a wind speed and a wind direction; and
   a housing protecting sensor elements.

2. The apparatus of claim 1, wherein the contact of wind on the symmetrical first portion results in a deflection of the deflectable member such that the capacitance of at least one of the capacitors changes and wherein the controller interprets this change in capacitance as the presence of wind.

3. The apparatus of claim 1, wherein the contact of rain on the symmetrical first portion results in a deflection of the deflectable member such that the capacitance of at least one of the capacitors is changed, the change in capacitance being an impulse and wherein the controller interprets this impulse as the presence of rain.

4. An apparatus for measuring weather related information including wind related information related to the environment, the apparatus comprising:
   a non-rotatable sensor configured to detect wind related information, wherein the non-rotatable sensor includes:
   a symmetrical first portion positioned such that the symmetrical first portion is contactable by the wind,
   a second portion positioned within the housing and having a plurality of sensor elements,
   a deflectable member overlaying the sensor elements of the second portion,
   a coupler coupling the symmetrical first portion to the deflectable member, and at least three conductive areas on a support and the deflectable member is grounded such that the at least three conductive areas and the deflectable member cooperate to form at least three capacitors;

a controller operably coupled to the sensor and configured to calculate at least one of a wind speed and a wind direction; and a housing protecting sensor elements.

5. The apparatus of claim 4, wherein the contact of wind on the symmetrical first portion results in a deflection of the deflectable member such that the capacitance of at least one of the capacitors changes and wherein the controller interprets this change in capacitance as the presence of wind.

6. The apparatus of claim 5, further comprising a reference sensor whose output the controller uses in analyzing the change in capacitance of the at least three capacitors to distinguish between the presence of a wind event and a non-wind event.

* * * * *